United States Patent
Gan et al.

(10) Patent No.: US 12,276,805 B2
(45) Date of Patent: Apr. 15, 2025

(54) METHOD AND SYSTEM FOR ACTIVELY ADJUSTING DIOPTER OF HEAD-MOUNTED DISPLAY, AND HEAD-MOUNTED DISPLAY

(71) Applicant: Shenzhen NED Optics Co., Ltd, Guangdong (CN)

(72) Inventors: Weihui Gan, Guangdong (CN); Jiangfeng Chen, Guangdong (CN); Donghua Liu, Guangdong (CN); Zaiyue Yang, Guangdong (CN); Huajun Peng, Guangdong (CN)

(73) Assignee: Shenzhen NED Optics Co., Ltd, Guangdong (CN)

( * ) Notice: Subject to any disclaimer, the term of this patent is extended or adjusted under 35 U.S.C. 154(b) by 0 days.

(21) Appl. No.: 18/663,317

(22) Filed: May 14, 2024

(65) Prior Publication Data
US 2024/0393602 A1   Nov. 28, 2024

(30) Foreign Application Priority Data

May 15, 2023   (CN) .......................... 202310547741.0

(51) Int. Cl.
*G02B 27/01* (2006.01)
(52) U.S. Cl.
CPC ..... *G02B 27/0176* (2013.01); *G02B 27/0172* (2013.01); *G02B 27/0179* (2013.01); *G02B 2027/014* (2013.01); *G02B 2027/0159* (2013.01); *G02B 2027/0185* (2013.01)

(58) Field of Classification Search
CPC .............. G02B 27/017; G02B 27/0176; G02B 27/0179; G02B 2027/014; G02B 2027/0159; G02B 2027/0185; G02B 27/0172

See application file for complete search history.

(56) References Cited

FOREIGN PATENT DOCUMENTS

| CN | 109643022 B | 7/2021 | |
|---|---|---|---|
| WO | WO-2019051643 A1 * | 3/2019 | ............. G02B 27/01 |

\* cited by examiner

*Primary Examiner* — Nitin Patel
*Assistant Examiner* — Cory A Almeida
(74) *Attorney, Agent, or Firm* — Nitin Kaushik

(57) ABSTRACT

The present invention relates to a method and system for actively adjusting diopter of a head-mounted display, and a head-mounted display. The method includes the following steps: adjusting a relative distance between a displaying component of the head-mounted display and an optical component by a motor driving component; presetting a mapping relationship between a diopter value and a motor pulse number; accordingly converting into a control signal for the motor driving component according to the mapping relationship; and actively adjusting the relative distance between the displaying component of the head-mounted display and the optical component by the motor driving component according to the control signal. A target diopter value is inputted and converted into a corresponding control signal. The motor driving component actively adjusts the relative distance between the displaying component of the head-mounted display and the optical component according to the control signal.

10 Claims, 5 Drawing Sheets

METHOD AND SYSTEM FOR ACTIVELY ADJUSTING DIOPTER OF HEAD-MOUNTED DISPLAY, AND HEAD-MOUNTED DISPLAY

CROSS REFERENCE TO RELATED APPLICATIONS

The present application claims the benefit of Chinese Patent Application No. 202310547741.0 filed on May 15, 2023, the contents of which are incorporated herein by reference in their entirety.

TECHNICAL FIELD

The present invention relates to the technical field of head-mounted displays, and more specifically to a method and system for actively adjusting diopter of a head-mounted display and a head-mounted display.

BACKGROUND

Through optical technology, a head-mounted display guides the video image light emitted by a micro-image display (e.g., a transmissive or reflective liquid crystal display screen, an organic electroluminescent device, and a DMD device) to the pupils of a user, so as to realize a virtual and enlarged image in a range close to the eyes of the user and provide the user with an intuitive and visible 2D/3D image, video and text information.

For people with poor vision, before use of the head-mounted display, it is necessary to adjust the diopter of the head-mounted display to adapt to the vision of the user. Existing head-mounted displays mainly adjust the diopter of both eyes of the head-mounted displays by manual driving. For example, Patent Literature 1 (CN109643022B) discloses a diopter-adjustment display device, which utilizes the cooperation of a driving gear and a driven gear, and drives the driven gear to rotate by rotating the driving gear, thereby adjusting a relative distance between a screen module and an eyepiece module to adjust the diopter, and realizing display of the diopter on the screen module with the cooperation of electronic devices. However, the diopter adjustment of the Patent Literature 1 is passive adjustment, and its mechanical structure is complex, the driving accuracy is poor, and errors are prone to occur. It cannot better adapt to the diopter of the wearer when in use, reducing the experience effect of the head-mounted display.

SUMMARY

The technical problem to be solved by the present invention is to provide a method and system for actively adjusting diopter of a head-mounted display, and a head-mounted display in view of the aforementioned defects of the prior art.

The technical solution adopted by the present invention to solve its technical problem is as follows.

A method for actively adjusting diopter of a head-mounted display is constructed, including the following steps:

adjusting a relative distance between a displaying component of the head-mounted display and an optical component by a motor driving component;

presetting a mapping relationship between a diopter value and a motor pulse number;

accordingly converting into a control signal for the motor driving component according to the mapping relationship; and actively adjusting the relative distance between the displaying component of the head-mounted display and the optical component by the motor driving component according to the control signal.

Further, the step of presetting a mapping relationship between a diopter value and a motor pulse number specifically includes:

calculating a quantity of change in the relative distance between the displaying component of the head-mounted display and the optical component generated each time one diopter gear is switched; and calculating and saving a desired motor pulse number according to the quantity of change.

Further, the step of accordingly converting into a control signal for the motor driving component according to the mapping relationship, specifically includes:

calculating a gear difference between a target diopter value and a current diopter value;

calculating a desired motor pulse number according to the gear difference;

accordingly converting the motor pulse number into a control signal of the motor driving component according to the mapping relationship, and outputting the control signal.

Further, it further includes the steps of:

actively adjusting the relative distance between the displaying component of the head-mounted display and the optical component by the motor driving component, to reset the current diopter value to diopter of 0°.

Further, it further includes the steps of:

setting and saving the diopter value that changes each time one diopter gear is switched;

setting and saving an adjustment range of the diopter gear.

Further, the diopter value changed each time the one diopter gear is adjusted is set to D, and a value range of D satisfies the following relational expression (1):

$$25° \leq D \leq 100°. \qquad (1)$$

Further, an adjustment range of the diopter gear is −800°∼+200°.

Further, the relative distance between the displaying component of the head-mounted display and the optical component is set to x according to the quantity of change generated by the control signal, and a value range of x satisfies the following relational expression (2):

$$-2.960 \leq x \leq 0.740. \qquad (2)$$

Further, a driving accuracy range of the motor driving component is ±0.010 mm.

The present invention provides a system for actively adjusting diopter of a head-mounted display, including:

a diopter data module for presetting a mapping relationship between a diopter value and a motor pulse number; and a diopter calculation module for accordingly converting an input signal into a control signal for a motor driving component according to the mapping relationship;

the motor driving component for actively adjusting the relative distance between the displaying component of the head-mounted display and the optical component according to the control signal;

an instruction input module for inputting a correction instruction and a diopter adjustment instruction; and an instruction output module for outputting the control signal to the motor driving component, wherein the relative distance between the displaying component of the head-mounted display and the optical component is actively adjusted by the motor driving component according to the control signal.

Further, it further includes:

a diopter correction module for outputting a correction instruction to the motor driving component.

The present invention provides a head-mounted display including the system for actively adjusting diopter of a head-mounted display as described in any one of the above.

The beneficial effects of the present disclosure are as follows: in the present application, a target diopter value is inputted and converted into a corresponding control signal. Instead of the manner of passively feeding back the diopter value by a traditional mechanical structure, the motor driving component actively adjusts the relative distance between the displaying component of the head-mounted display and the optical component according to the control signal, can reduce the accumulation of errors during the diopter adjustment process and achieve precise control, and has high driving accuracy, so that when in use, the head-mounted display can better adapt to the diopter of a wearer, bringing a better experience effect to the wearer.

BRIEF DESCRIPTION OF THE DRAWINGS

In order to more clearly illustrate the embodiments of the present invention or technical solutions in the prior art, the present invention will be further described hereafter with reference to accompanying drawings and embodiments. The accompanying drawings in the following description are only some embodiments of the present invention, and those of ordinary skills in the art may still derive other drawings from these accompanying drawings without creative efforts.

In the figures, 1. displaying component; 3. optical component; 4. motor driving component; 5. flexible circuit board; 6. infrared sensor; 7. extension spring; 8. light-shielding blade; 11. driving arm; 21. diopter data module; 22. diopter calculation module; 23. instruction input module; 24. instruction output module; 25. diopter correction module; 41. motor retaining bracket; 42. stepper motor; 43. limit block; 44. driving nut; 45. motor driving module; 231. serial port communication unit; 232. IO interface unit.

DETAILED DESCRIPTION OF THE PREFERRED EMBODIMENT

In order to make the objectives, technical solutions and advantages of the embodiments of the present invention clearer, the following will clearly and completely describe the technical solutions in connection with the embodiments of the present invention, and apparently the described embodiments are a part rather than all of the embodiments of the present invention. All other embodiments obtained by those of ordinary skills in the art based on the embodiments of the present invention without creative efforts are within the claimed scope of the present invention.

Figure 1:
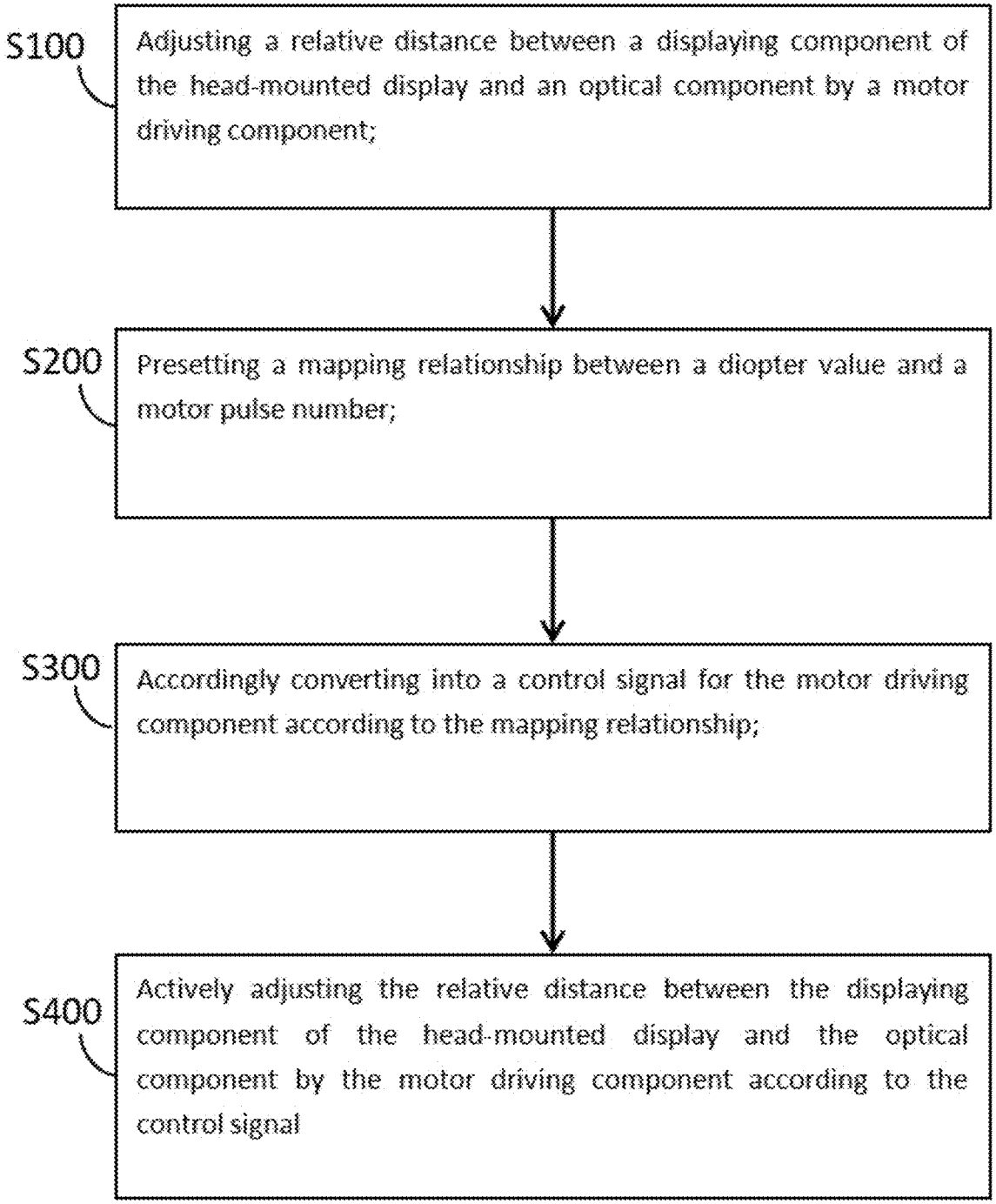
FIG. 1 is a flow block diagram of a method for actively adjusting diopter of a head-mounted display according to an embodiment of the present invention.

An embodiment of the present invention provides method for actively adjusting diopter of a head-mounted display is constructed, which, as shown in FIG. 1, includes the following steps:

S100: adjusting a relative distance between a displaying component of the head-mounted display and an optical component by a motor driving component;

S200: presetting a mapping relationship between a diopter value and a motor pulse number;

S300: accordingly converting into a control signal for the motor driving component according to the mapping relationship; and S400: actively adjusting the relative distance between the displaying component of the head-mounted display and the optical component by the motor driving component according to the control signal.

Specifically, the presetting a mapping relationship between a diopter value and a motor pulse number is equivalent to establishing a database. After a signal of a target diopter value is inputted by a user, the input signal is analyzed and calculated accordingly, and the input signal is converted into a control signal according to the mapping relationship and outputted to the motor driving component. The motor driving component actively adjusts the relative distance between a displaying component of the head-mounted display and the optical component according to the control signal. For example, a user sends an input signal for myopia of 200° to the head-mounted display. The inputted signal for myopia of 200° is converted into a corresponding control signal according to the mapping relationship. The motor driving component actively adjusts the relative distance between the head-mounted display and the optical component to the relative distance when the myopia is 200°, according to the control signal.

In the present application, a target diopter value is inputted and converted into a corresponding control signal. Instead of the manner of passively feeding back the diopter value by a traditional mechanical structure, the motor driving component actively adjusts the relative distance between the displaying component of the head-mounted display and the optical component according to the control signal, can reduce the accumulation of errors during the diopter adjustment process and achieve precise control, and has high driving accuracy, so that when in use, the head-mounted display can better adapt to the diopter of a wearer, bringing a better experience effect to the wearer.

In this embodiment, the motor driving component drives the displaying component to move toward or away from the optical component, thereby adjusting the relative distance between the displaying component and the optical component to adjust the diopter of the head-mounted display.

In one of optional implementations, the motor driving component drives the optical component to move toward or away from the displaying component, thereby adjusting the relative distance between the displaying component and the optical component to adjust the diopter of the head-mounted display.

In one of the optional implementations, the motor driving component drives the optical lens in the optical component to move, i.e., internal zooming, so as to realize the adjustment of the diopter of the head-mounted display.

In a further embodiment, the step of presetting a mapping relationship between a diopter value and a motor pulse number specifically includes:

calculating a quantity of change in the relative distance between the displaying component of the head-mounted display and the optical component generated each time one diopter gear is switched; and calculating and saving a desired motor pulse number according to the quantity of change.

Specifically, when one diopter gear is switched from the 0° diopter position, the relative distance between the displaying component and the optical component changes. At this time, the relative distance between the displaying component and the optical component after the switching is measured, and then compared with the relative distance between the displaying component and the optical component before the switching, so as to solve a difference as the quantity of change. This quantity of change is fixed, and does not change no matter where one diopter gear is switched. According to the quantity of change and in combination with the mechanical structural parameters of the motor driving component, such as a step angle, a screw pitch of a drive screw, etc., the stepper motor pulse number required to achieve the quantity of change is calculated. The stepper motor pulse number is also a fixed value. Calculation at subsequent adjustment of the diopter is each based on the stepper motor pulse number. For example, each time one diopter gear is adjusted, the quantity of change in the relative distance between the displaying component of the head-mounted display and the optical component is 0.185 mm. 0.185 mm is also the displacement of a moving device of one of the displaying component and the optical component. The quantity of change of 0.185 mm needs to output 320 pulses to the stepper motor.

In a further embodiment, the step of accordingly converting into a control signal for the motor driving component according to the mapping relationship, specifically includes:

calculating a gear difference between a target diopter value and a current diopter value;

calculating a desired motor pulse number according to the gear difference;

accordingly converting the motor pulse number into a control signal of the motor driving component according to the mapping relationship, and outputting the control signal.

In the aforementioned embodiment, after the user inputs the input signal of the target diopter value, the system calculates a gear difference between the target diopter value and the current diopter value. By using this gear difference combined with the mapping relationship, the number of stepper motor pulses that need to be outputted to the motor driving component required for achieving the target diopter value, is calculated and converted into a corresponding control signal. The motor driving component actively adjusts the relative distance between the displaying component of the head-mounted display and the optical component according to the control signal, so as to produce a corresponding quantity of change (i.e., a displacement stroke). For example, if the diopter value changed each time one diopter gear is switched is set to 50°, and the quantity of change is 0.185 mm, 320 motor pulses are required. Then, when the user inputs a signal for myopia of 200° at the diopter of 0°, the changed diopter value is 200°. 200° is divided by 50°, and it is concluded that 4 diopter gears need to be switched. These 4 diopter gears require a total of 1,280 (4 * 320=1,280) stepper motor pulses to be outputted to the motor driving component. Where errors are ignored, a quantity of change of 0.740 mm will be generated after the adjustment of the relative distance between the displaying component of the head-mounted display and the optical component.

In a further embodiment, it further includes the steps of:

actively adjusting the relative distance between the displaying component of the head-mounted display and the optical component by the motor driving component, to reset the current diopter value to diopter of 0°.

The head-mounted display is provided with a sensing component and a light-shielding component. In this embodiment, the sensing component is an infrared sensor disposed on the motor driving component, and the light-shielding component is a light-shielding blade disposed on the displaying component. The position of the diopter of 0° is a high and low level switching position between the infrared sensor and the light-shielding blade. During the movement of the displaying component driven by the motor driving component, when the light-shielding blade enters the detection range of the infrared sensor, the high and low level switching is conducted, thereby knowing the relative position of the displaying component. By correcting the motor driving component, the motor driving component can be adjusted from the reference position of the diopter of 0° each time it is used, thereby reducing the accumulation of errors, making the adjustment more precise, making the head-mounted display better adapt to the diopter of a wearer, and bringing a better experience effect to the wearer.

Specifically, the system has a preset program that sends a control signal to the motor driving component each time it is turned on and off, so that the motor driving component actively drives the displaying component to reset to the position at the diopter of 0°, and then to reset to the diopter position before the last turndown. Thereafter, the user can also actively input a correction instruction, and the system will convert the correction instruction into a control signal accordingly. After the motor driving component actively drives the displaying component to reset to the signal of the diopter of 0°, the user then inputs the input signal of the target diopter value.

In a further embodiment, it further includes the steps of:

setting and saving the diopter value that changes each time one diopter gear is switched;

setting and saving an adjustment range of the diopter gear.

The diopter value changed each time one diopter gear is switched is a fixed value. The user can switch gears one by one to achieve the target diopter value sequentially, and can also directly input the target diopter value within the adjustment range of the diopter gear.

In a further embodiment, the diopter value changed each time the one diopter gear is adjusted is set to D, and a value range of D satisfies the following relational expression (1):

$$25° \leq D \leq 100°. \tag{1}$$

wherein, the value of D can be 25°, 50°, 100°, etc. Each time one diopter gear is switched, the left and right eyes of the head-mounted display will change by a corresponding diopter value. For example, the diopter value changed each time one diopter gear is switched is 50°. When the user switches from 100° for myopia to 400° for myopia according to one gear sequentially, a total of 6 times of adjustment are required. The user can also directly input the required diopter value for myopia of 400°. The system calculates the gear difference between the myopia of 400° and the current myopia of 100°. It is concluded by calculation that 6 diopter gears are required, and the stepper motor pulse number required for the 6 diopter steps is outputted to the motor driving component.

In a further embodiment, an adjustment range of the diopter gear is −800°-+200°.

The adjustment of the diopter gear can be −800°, −700°, −625°, −600°, −500°, −450°, −325°, −300°, −200°, −100°, 0°, 50°, 100°, 150°, 200°, etc., where + and − simply represent myopia or hyperopia. For example, −800° means myopia of 800° and 200° means hyperopia of 200°.

In a further embodiment, the relative distance between the displaying component of the head-mounted display and the optical component is set to x according to the quantity of change generated by the control signal, and a value range of x satisfies the following relational expression (2):

$$-2.960 \leq x \leq 0.740. \qquad (2)$$

The value of the quantity of change x can be −2.960 mm, −2.226 mm, −2.031 mm, −1.853 mm, −1.481 mm, −1.117 mm, −0.928 mm, −0.740 mm, −0.370 mm, −0.191 mm, 0.190 mm, 0.371 mm, 0.558 mm, and 0.740 mm. This quantity of change x is variable and is different from the quantity of change preset in the mapping relationship. Specifically, −2.960 mm is the displacement distance of the displaying component when the diopter is 800° for myopia, and 0.740 mm is the displacement distance of the displaying component when the diopter is 200° for hyperopia. Based on the cooperation between the displaying component and the optical component, it can be known that when the diopter is hyperopia, the greater the diopter is, the farther the displaying component is from the optical component. When the diopter is myopia, the greater the diopter is, the closer the displaying component is to the optical component. The reference position at the diopter of 0° is between hyperopia and myopia, so the quantity of change in the direction of hyperopia is positive and the quantity of change in the direction of myopia is negative.

In a further embodiment, the driving accuracy range of the motor driving component is ±0.010 mm.

Specifically, due to the mechanical structure of the motor driving component and the situation in which errors are prone to generate in a process in which an instruction is read by an electronic element, the quantity of change caused when the relative distance between the displaying component of the head-mounted display and the optical component is actively adjusted by the motor driving component according to the control signal is not a multiple of the preset quantity of change, and there will be a certain error. However, the motor driving component of the present application adopts a stepper motor with a small step angle and a very small resolution (the distance the nut moves per driving step) of about 0.005 mm. The driving accuracy can be controlled within ±0.01 mm and is high, which can further reduce the error.

Furthermore, the head-mounted display further includes a host computer and a button. The host computer can be a controller of the head-mounted display, or a manipulation device of a wearer connected to the head-mounted display, e.g., a mobile phone, a tablet, etc. The host computer is connected to a control system through a UART interface. The UART interface is a universal asynchronous receiver/transmitter, i.e., serial port communication.

In this embodiment, the wearer can directly input the target diopter gear and a correction instruction through the host computer. For example, if the wearer needs to adjust the diopter to a diopter gear of 500° for myopia or 200° for hyperopia, he/she can input a correction instruction to the control system of the head-mounted display through the host computer. After the stepper motor is corrected, a diopter gear adjustment instruction of 500° for myopia or 200° for hyperopia can be directly inputted into the control system of the head-mounted display through the host computer, which is more convenient for adjustment.

The button is connected to the control system of the head-mounted display through an IO interface. The button is divided into + and − ends. Each time the button is pressed, one diopter gear D is adjusted. For example, the diopter D that changes each time one diopter gear is adjusted is 50°. If the wearer needs to adjust the diopter to the diopter gear of 500° for myopia, he/she needs to press the − end of the button for 10 times. If the wearer needs to adjust the diopter to the diopter gear of 100° for hyperopia, he/she needs to press the + end of the button twice. In this embodiment, the button cannot be used for inputting the correction instruction.

Figure 3:
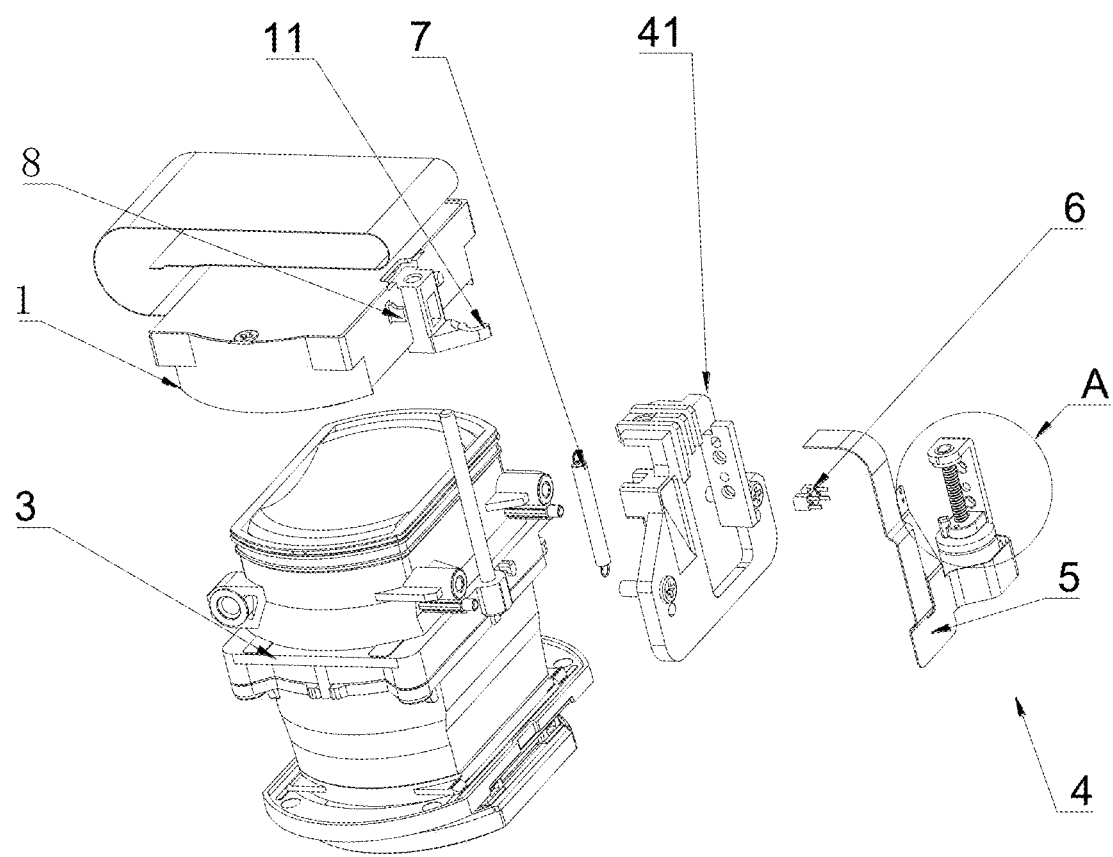
FIG. 3 is a schematic exploded view of a diopter adjustment device according to an embodiment of the present invention.
Figure 4:
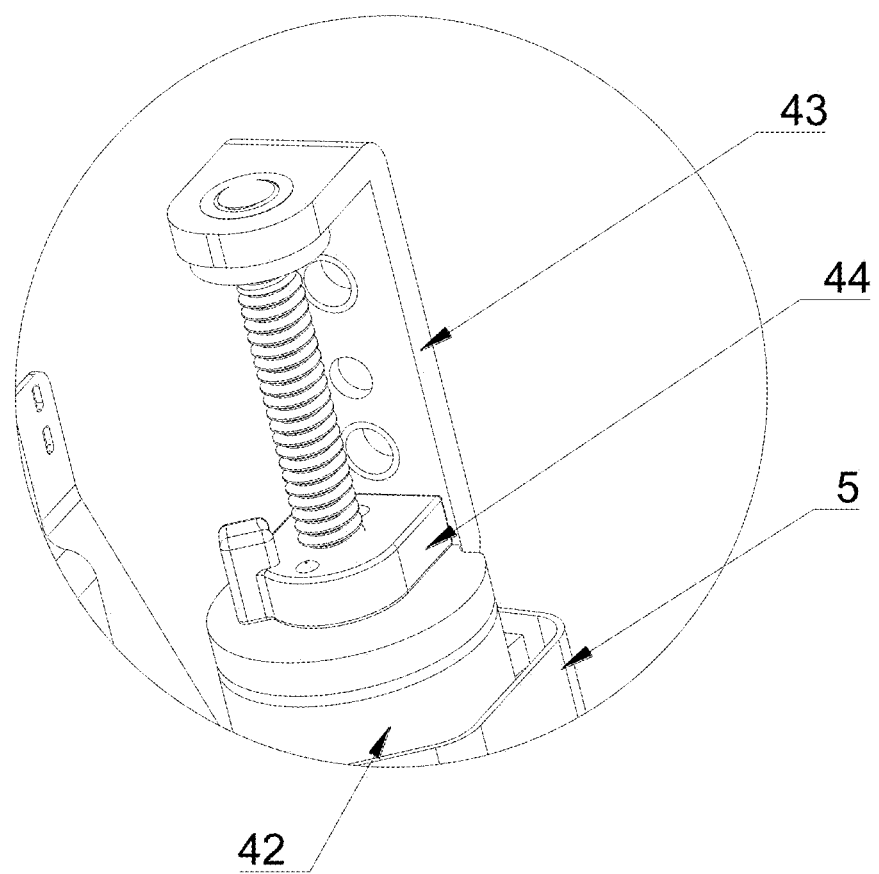
FIG. 4 is a schematic enlarged diagram of position A in FIG. 3 according to an embodiment of the present invention.
Figure 5:
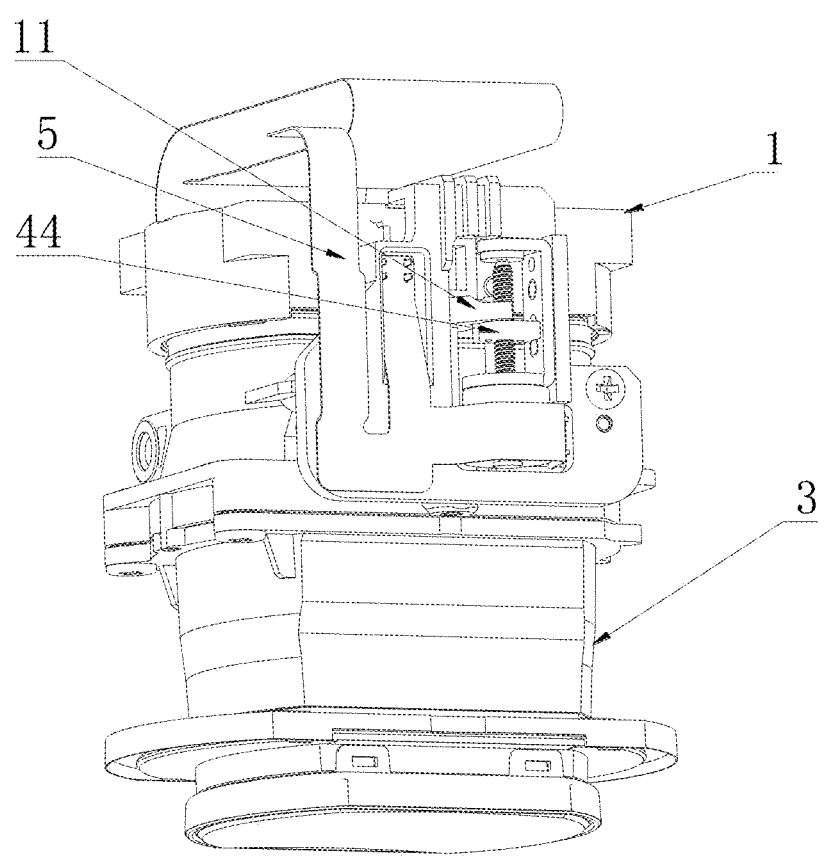
FIG. 5 is a schematic structural diagram of the diopter adjustment device according to an embodiment of the present invention.

In the aforementioned embodiments, as shown in FIGS. 3 to 5, the head-mounted display includes a displaying component, an optical component, a motor driving component, a control system, a sensing component, and a light-shielding component, etc. The motor driving component 4 includes a motor retaining bracket 41 installed on an eyepiece system 3, a stepper motor 42 installed on the motor retaining bracket 41, a limit block 43 disposed on the stepper motor 42, and a driving nut 44 disposed on a drive screw of the stepper motor 42. The driving nut 44 is limited by the limit block 43. When the drive screw of the stepper motor 42 rotates, the driving nut 44 keeps moving up and down in a straight line and does not rotate. The displaying component 1 is provided with a driving arm 11 that cooperates with the driving nut 44. The driving nut 44 drives the driving arm 11 to move. The displaying component 1 and the optical component 3 cooperate with each other through a hanging shaft and a guide sleeve, and the displaying component 1 and the optical component 3 are connected through an extension spring 7. A main control component 2 is a flexible circuit board 5 connected to the stepper motor 42, an infrared sensor 6 is disposed on the flexible circuit board 5, and a light-shielding blade 8 is disposed on the displaying component 1. The stepper motor 42 is activated, the drive screw rotates, and thus the driving nut 44 is driven to reciprocate. In the direction of the displaying component 1 away from the optical component 3, as driven by the driving nut 44, the driving arm 11 drives the displaying component 1 moves linearly toward a direction away from the optical component 3. In the direction of the displaying component 1 approaching the optical component 3, the driving nut 44 moves back. At this time, the displaying component 1 moves toward a direction approaching the optical component 3 as driven by the extension spring 7, and the driving arm 11 keeps in contact with the driving nut 44. During correction, the light-shielding blade 8 enters the detection range of the infrared sensor 6. At this time, the infrared sensor 6 switches between high and low levels. By finding a high and low level switching position, the displaying component 1 can be reset to the reference position at the diopter of 0°.

Figure 2:
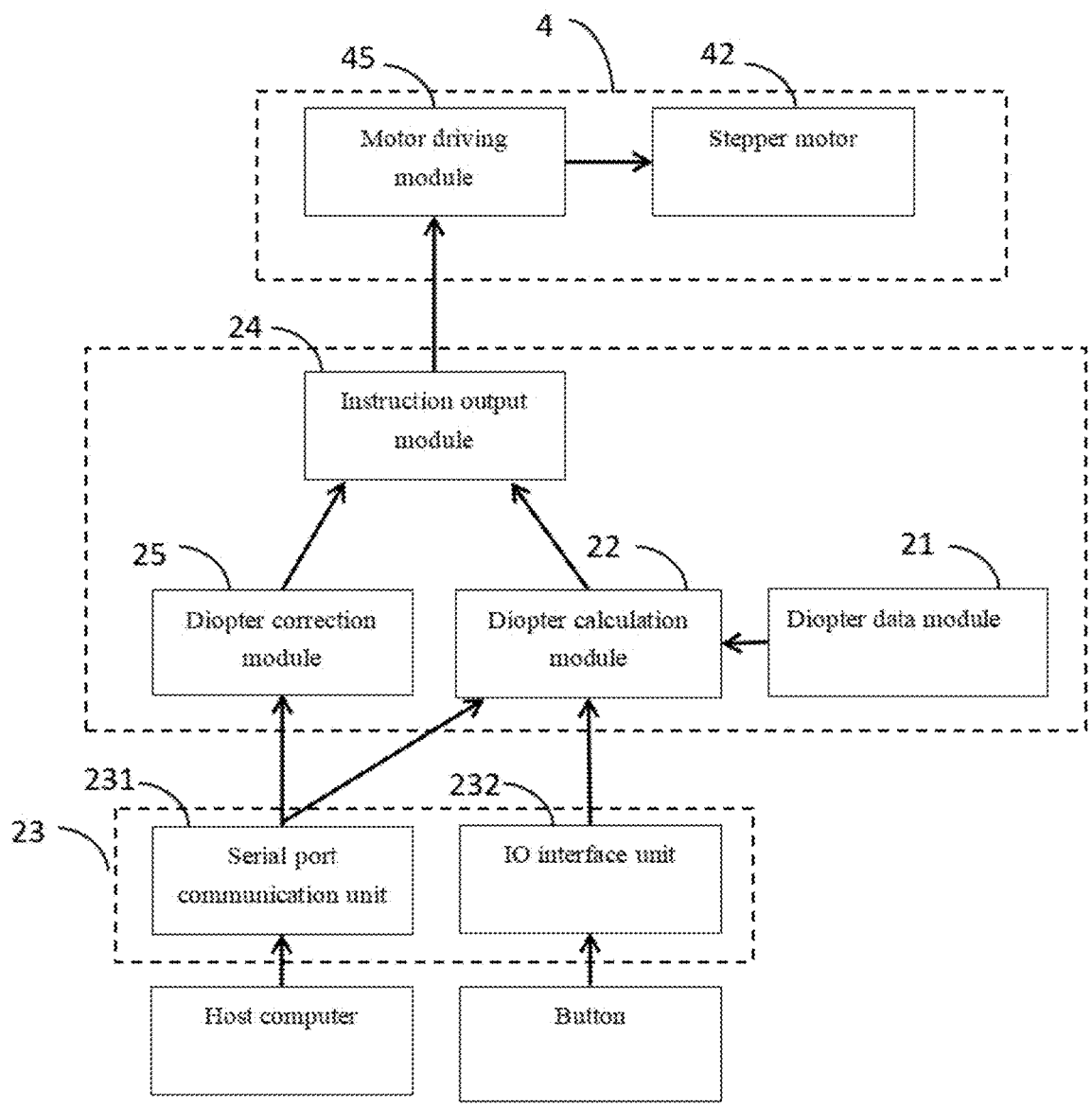
FIG. 2 is a flow block diagram of a system for actively adjusting diopter of a head-mounted display according to another embodiment of the present invention.

In another embodiment, the present invention provides a system for actively adjusting diopter of a head-mounted display, which as shown in FIG. 2, includes:

- a diopter data module 21 for presetting a mapping relationship between a diopter value and a motor pulse number;
- a diopter calculation module 22 for accordingly converting an input signal into a control signal for a motor driving component according to the mapping relationship;
- the motor driving component 4 for actively adjusting the relative distance between the displaying component of the head-mounted display and the optical component according to the control signal;
- an instruction input module 23 for inputting a correction instruction and a diopter adjustment instruction; and
- an instruction output module 24 for outputting the control signal to the motor driving component, wherein the relative distance between the displaying component 1 of the head-mounted display and the optical component 3 is actively adjusted by the motor driving component 4 according to the control signal.

Further, it further includes:

- a diopter correction module 25 for outputting a correction instruction to the motor driving component 4.

The motor driving component 4 includes a stepper motor 42 and a motor driving module 45. The motor driving module 45 drives the stepper motor 42 to work.

The instruction input module 23 includes a serial port communication unit 231 and an IO interface unit 232. The serial port communication unit 231 is used for acquiring an inputted correction instruction or diopter gear adjustment instruction, and the IO interface unit 232 is used for acquiring an inputted diopter adjustment instruction. The host computer is electrically connected to the diopter calculation module 22 through the serial port communication unit 231. The button is electrically connected to the diopter calculation module 22 through the IO interface unit 232. The host computer is further electrically connected to the diopter correction module 25 through the serial port communication unit 231.

After the diopter correction module 25 acquires the correction instruction, the correction instruction is outputted to the motor driving module 45 through the instruction output module 24, and the motor driving module 45 drives the stepper motor 42 to work. The stepper motor 42 drives the displaying component 1 to run from the current diopter position to the reference position at the diopter of 0°, i.e., the high and low level switching position of the infrared sensor 6 and the light-shielding blade 8.

In the present application, a target diopter value is inputted and converted into a corresponding control signal. Instead of the manner of passively feeding back the diopter value by a traditional mechanical structure, the motor driving component actively adjusts the relative distance between the displaying component of the head-mounted display and the optical component according to the control signal, can reduce the accumulation of errors during the diopter adjustment process and achieve precise control, and has high driving accuracy, so that when in use, the head-mounted display can better adapt to the diopter of a wearer, bringing a better experience effect to the wearer.

The principle, solution and adjustment results of the aforementioned system for actively adjusting diopter of a head-mounted display are further explained hereafter through more specific examples.

Example 1

TABLE 1

| | Hyperopia-Myopia | | | Myopia-Hyperopia | | | |
|---|---|---|---|---|---|---|---|
| Diopter | Distance (mm) | Distance difference from the previous section | Error | Diopter | Distance (mm) | Distance difference from the previous section | Error |
| 200° | 0.740 | | | −800° | −2.960 | | |
| 150° | 0.556 | −0.184 | Empty return data | −750° | −2.770 | 0.190 | Empty return data |
| 100° | 0.371 | −0.185 | 0.000 | −700° | −2.590 | 0.180 | −0.005 |
| 50° | 0.190 | −0.181 | 0.004 | −650° | −2.410 | 0.180 | −0.005 |
| 0° | 0.000 | −0.190 | −0.005 | −600° | −2.222 | 0.188 | 0.003 |
| −50° | −0.191 | −0.191 | −0.006 | −550° | −2.031 | 0.191 | 0.006 |
| −100° | −0.370 | −0.179 | 0.006 | −500° | −1.853 | 0.178 | −0.007 |
| −150° | −0.561 | −0.191 | −0.006 | −450° | −1.662 | 0.191 | 0.006 |
| −200° | −0.740 | −0.179 | 0.006 | −400° | −1.481 | 0.181 | −0.004 |
| −250° | −0.929 | −0.189 | −0.004 | −350° | −1.293 | 0.188 | 0.003 |
| −300° | −1.114 | −0.185 | 0 | −300° | −1.117 | 0.176 | −0.009 |
| −350° | −1.302 | −0.188 | −0.003 | −250° | −0.928 | 0.189 | 0.004 |
| −400° | −1.496 | −0.194 | −0.009 | −200° | −0.744 | 0.184 | −0.001 |
| −450° | −1.675 | −0.179 | 0.006 | −150° | −0.559 | 0.185 | 0 |
| −500° | −1.850 | −0.175 | 0.010 | −100° | −0.371 | 0.188 | 0.003 |
| −550° | −2.036 | −0.186 | −0.001 | −50° | −0.182 | 0.189 | 0.004 |
| −600° | −2.226 | −0.190 | −0.005 | 0° | 0.000 | 0.182 | −0.003 |
| −650° | −2.405 | −0.179 | 0.006 | 100° | 0.190 | 0.190 | 0.005 |
| −700° | −2.600 | −0.195 | −0.010 | 150° | 0.370 | 0.180 | −0.005 |
| −750° | −2.777 | −0.177 | 0.008 | 200° | 0.557 | 0.187 | 0.002 |
| −800° | −2.960 | −0.183 | 0.002 | 50° | 0.740 | 0.183 | −0.002 |

Example 1 provides a system for actively adjusting diopter of a head-mounted display, which as shown in FIG. 2, includes a motor driving component 4, a displaying component 1 with a display screen, an optical component 3, a diopter data module 21, a diopter calculation module 22, an instruction input module 23, an instruction output module 24 and a diopter correction module 25. A host computer is electrically connected to the diopter calculation module 22 and the diopter correction module 25 respectively through a serial port communication unit 231. A button is electrically connected to the diopter calculation module 22 through an IO interface unit 232, and is used for inputting a correction instruction and a diopter gear adjustment instruction. The diopter data module 21 stores a preset mapping relationship, and the diopter calculation module 22 and the diopter correction module 25 are both electrically connected to the instruction output module 24.

After the diopter correction module 25 acquires the correction instruction, the correction instruction is outputted to the motor driving module 45 through the instruction output module 24, and the motor driving module 45 drives the stepper motor 42 to work. The stepper motor 42 drives the displaying component 1 to run from the current diopter position to the reference position at the diopter of 0°, i.e., the high and low level switching position of the infrared sensor 6 and the light-shielding blade 8. After acquiring an input instruction of a target diopter, the diopter calculation module 22 calculates a gear difference between the target diopter value and the current diopter value, and calculates a stepper motor pulse number required for the gear difference according to the relationship stored in the diopter data module 21. The stepper motor pulse number is accordingly converted to a control signal. The control signal is outputted to the motor driving module 45 through the instruction output module 24, and the motor driving module 45 controls the stepper motor 42 to actively adjust the relative distance between the displaying component 1 of the head-mounted display and the optical component 3 according to the control signal, so as to produce a corresponding quantity of change.

Table 1 shows the actual quantities of change and errors caused by the relative distance between the displaying component and the optical component during the adjustment of the head-mounted display. The reference position at the diopter of 0° is between hyperopia and myopia. The actual quantity of change in the hyperopia direction is a positive value, and the actual quantity of change in the myopia direction is a negative value. In Table 1, the data on the left side is the actual quantity of change caused by the relative distance between the displaying component and the optical component each time one diopter gear is adjusted during the process of adjusting from 200° for hyperopia to 800° for myopia; and the data on the right side is the actual quantity of change caused by the relative distance between the displaying component and the optical component each time one diopter gear is adjusted during the process of adjusting from 800° for myopia to 200° for hyperopia. The diopter D changed each time one diopter gear is adjusted is set to 50°, the preset quantity of change each time one diopter gear is adjusted is set to 0.185 mm, and the required stepper motor pulse number is set to 320. The optical screw moves without load, and the input voltage of the stepper motor is 0.6 V. Since there is a slight gap among the cooperation of the mechanical structures, the actual quantity of change in the initial stage will include empty back data, and the actual quantity of change including the empty back data will not be counted into the error calculation range.

Example 2

TABLE 2

| | Hyperopia-Myopia | | | | Myopia-Hyperopia | | |
|---|---|---|---|---|---|---|---|
| Diopter | Distance (mm) | Distance difference from the previous section | Error | Diopter | Distance (mm) | Distance difference from the previous section | Error |
| 200° | 0.740 | | | −800° | −2.960 | | |
| 150° | 0.552 | −0.188 | Empty return data | −750° | −2.773 | 0.187 | Empty return data |
| 100° | 0.373 | −0.179 | 0.006 | −700° | −2.588 | 0.185 | 0.000 |
| 50° | 0.194 | −0.179 | 0.006 | −650° | −2.406 | 0.182 | −0.003 |
| 0° | 0.000 | −0.194 | −0.009 | −600° | −2.225 | 0.181 | −0.004 |
| −50° | −0.195 | −0.195 | −0.01 | −550° | −2.036 | 0.189 | 0.004 |
| −100° | −0.372 | −0.177 | 0.008 | −500° | −1.853 | 0.183 | −0.002 |
| −150° | −0.563 | −0.191 | −0.006 | −450° | −1.674 | 0.179 | −0.006 |
| −200° | −0.741 | −0.178 | 0.007 | −400° | −1.490 | 0.184 | −0.001 |
| −250° | −0.932 | −0.191 | −0.006 | −350° | −1.299 | 0.191 | 0.006 |
| −300° | −1.118 | −0.186 | −0.001 | −300° | −1.115 | 0.184 | −0.001 |
| −350° | −1.306 | −0.188 | −0.003 | −250° | −0.925 | 0.190 | 0.005 |
| −400° | −1.498 | −0.192 | −0.007 | −200° | −0.740 | 0.185 | 0 |
| −450° | −1.676 | −0.178 | 0.007 | −150° | −0.555 | 0.185 | 0 |
| −500° | −1.856 | −0.180 | 0.005 | −100° | −0.373 | 0.182 | −0.003 |
| −550° | −2.040 | −0.184 | 0.001 | −50° | −0.192 | 0.181 | −0.004 |
| −600° | −2.229 | −0.189 | −0.004 | 0° | 0.000 | 0.192 | 0.007 |
| −650° | −2.410 | −0.181 | 0.004 | 100° | 0.192 | 0.192 | 0.007 |
| −700° | −2.599 | −0.189 | −0.004 | 150° | 0.379 | 0.187 | 0.002 |
| −750° | −2.775 | −0.176 | 0.009 | 200° | 0.558 | 0.179 | −0.006 |
| −800° | −2.960 | −0.185 | 0 | 50° | 0.740 | 0.182 | −0.003 |

Example 2 provides a system for actively adjusting diopter of a head-mounted display, which as shown in FIG. 2, includes a motor driving component 4, a displaying component 1 with a display screen, an optical component 3, a diopter data module 21, a diopter calculation module 22, an instruction input module 23, an instruction output module 24 and a diopter correction module 25. A host computer is electrically connected to the diopter calculation module 22 and the diopter correction module 25 respectively through a serial port communication unit 231. A button is electrically connected to the diopter calculation module 22 through an IO interface unit 232, and is used for inputting a correction instruction and a diopter gear adjustment instruction. The diopter data module 21 stores a preset mapping relationship, and the diopter calculation module 22 and the diopter correction module 25 are both electrically connected to the instruction output module 24.

After the diopter correction module 25 acquires the correction instruction, the correction instruction is outputted to the motor driving module 45 through the instruction output module 24, and the motor driving module 45 drives the stepper motor 42 to work. The stepper motor 42 drives the displaying component 1 to run from the current diopter position to the reference position at the diopter of 0°, i.e., the high and low level switching position of the infrared sensor 6 and the light-shielding blade 8. After acquiring an input instruction of a target diopter, the diopter calculation module 22 calculates a gear difference between the target diopter value and the current diopter value, and calculates a stepper motor pulse number required for the gear difference according to the relationship stored in the diopter data module 21. The stepper motor pulse number is accordingly converted to a control signal. The control signal is outputted to the motor driving module 45 through the instruction output module 24, and the motor driving module 45 controls the stepper motor 42 to actively adjust the relative distance between the displaying component 1 of the head-mounted display and the optical component 3 according to the control signal, so as to produce a corresponding quantity of change.

Table 2 shows the actual quantities of change and errors caused by the relative distance between the displaying component and the optical component during the adjustment of the head-mounted display. The reference position at the diopter of 0° is between hyperopia and myopia. The actual quantity of change in the hyperopia direction is a positive value, and the actual quantity of change in the myopia direction is a negative value. In Table 2, the data on the left side is the actual quantity of change caused by the relative distance between the displaying component and the optical component each time one diopter gear is adjusted during the process of adjusting from 200° for hyperopia to 800° for myopia; and the data on the right side is the actual quantity of change caused by the relative distance between the displaying component and the optical component each time one diopter gear is adjusted during the process of adjusting from 800° for myopia to 200° for hyperopia. The diopter D changed each time one diopter gear is adjusted is set to 50°, the preset quantity of change each time one diopter gear is adjusted is set to 0.185 mm, and the required stepper motor pulse number is set to 320. The optical screw moves with a load, and the input voltage of the stepper motor is 0.6 V. Since there is a slight gap among the cooperation of the mechanical structures, the actual quantity of change in the initial stage will include empty back data, and the actual quantity of change including the empty back data will not be counted into the error calculation range.

Example 3

TABLE 3

| | Hyperopia-Myopia | | | | Myopia-Hyperopia | | |
|---|---|---|---|---|---|---|---|
| Diopter | Distance (mm) | Distance difference from the previous section | Error | Diopter | Distance (mm) | Distance difference from the previous section | Error |
| 200° | 0.740 | | | −800° | −2.960 | | |
| 150° | 0.548 | −0.192 | Empty return data | −750° | −2.769 | 0.191 | Empty return data |
| 100° | 0.372 | −0.176 | 0.009 | −700° | −2.588 | 0.181 | −0.004 |
| 50° | 0.195 | −0.177 | 0.008 | −650° | −2.410 | 0.178 | −0.007 |
| 0° | 0.000 | −0.195 | −0.010 | −600° | −2.225 | 0.185 | 0 |
| −50° | −0.195 | −0.195 | −0.010 | −550° | −2.037 | 0.188 | 0.003 |
| −100° | −0.372 | −0.177 | 0.008 | −500° | −1.855 | 0.182 | −0.003 |
| −150° | −0.562 | −0.190 | −0.005 | −450° | −1.677 | 0.178 | −0.007 |
| −200° | −0.743 | −0.181 | 0.004 | −400° | −1.491 | 0.186 | 0.001 |
| −250° | −0.930 | −0.187 | −0.002 | −350° | −1.301 | 0.190 | 0.005 |
| −300° | −1.115 | −0.185 | 0 | −300° | −1.116 | 0.185 | 0 |
| −350° | −1.308 | −0.193 | −0.008 | −250° | −0.928 | 0.188 | 0.003 |
| −400° | −1.499 | −0.191 | −0.006 | −200° | −0.746 | 0.182 | −0.003 |
| −450° | −1.674 | −0.175 | 0.010 | −150° | −0.559 | 0.187 | 0.002 |
| −500° | −1.853 | −0.179 | 0.006 | −100° | −0.375 | 0.184 | −0.001 |
| −550° | −2.042 | −0.189 | −0.004 | −50° | −0.195 | 0.180 | −0.005 |
| −600° | −2.226 | −0.184 | 0.001 | 0° | 0.000 | 0.195 | 0.010 |
| −650° | −2.415 | −0.189 | −0.004 | 100° | 0.195 | 0.195 | 0.010 |
| −700° | −2.591 | −0.176 | 0.009 | 150° | 0.382 | 0.187 | 0.002 |
| −750° | −2.773 | −0.182 | 0.003 | 200° | 0.561 | 0.179 | −0.006 |
| −800° | −2.960 | −0.187 | −0.002 | 50° | 0.740 | 0.179 | −0.006 |

Example 3 provides a system for actively adjusting diopter of a head-mounted display, which as shown in FIG. 2, includes a motor driving component 4, a displaying component 1 with a display screen, an optical component 3, a diopter data module 21, a diopter calculation module 22, an instruction input module 23, an instruction output module 24 and a diopter correction module 25. A host computer is electrically connected to the diopter calculation module 22 and the diopter correction module 25 respectively through a serial port communication unit 231. A button is electrically connected to the diopter calculation module 22 through an IO interface unit 232, and is used for inputting a correction instruction and a diopter gear adjustment instruction. The diopter data module 21 stores a preset mapping relationship, and the diopter calculation module 22 and the diopter correction module 25 are both electrically connected to the instruction output module 24.

After the diopter correction module 25 acquires the correction instruction, the correction instruction is outputted to the motor driving module 45 through the instruction output module 24, and the motor driving module 45 drives the stepper motor 42 to work. The stepper motor 42 drives the displaying component 1 to run from the current diopter position to the reference position at the diopter of 0°, i.e., the high and low level switching position of the infrared sensor 6 and the light-shielding blade 8. After acquiring an input instruction of a target diopter, the diopter calculation module 22 calculates a gear difference between the target diopter value and the current diopter value, and calculates a stepper motor pulse number required for the gear difference according to the relationship stored in the diopter data module 21. The stepper motor pulse number is accordingly converted to a control signal. The control signal is outputted to the motor driving module 45 through the instruction output module 24, and the motor driving module 45 controls the stepper motor 42 to actively adjust the relative distance between the displaying component 1 of the head-mounted display and the optical component 3 according to the control signal, so as to produce a corresponding quantity of change.

Table 3 shows the actual quantities of change and errors caused by the relative distance between the displaying component and the optical component during the adjustment of the head-mounted display. The reference position at the diopter of 0° is between hyperopia and myopia. The actual quantity of change in the hyperopia direction is a positive value, and the actual quantity of change in the myopia direction is a negative value. In Table 3, the data on the left side is the actual quantity of change caused by the relative distance between the displaying component and the optical component each time one diopter gear is adjusted during the process of adjusting from 200° for hyperopia to 800° for myopia; and the data on the right side is the actual quantity of change caused by the relative distance between the displaying component and the optical component each time one diopter gear is adjusted during the process of adjusting from 800° for myopia to 200° for hyperopia. The diopter D changed each time one diopter gear is adjusted is set to 50°, the preset quantity of change each time one diopter gear is adjusted is set to 0.185 mm, and the required stepper motor pulse number is set to 320. The optical screw moves with a load, and the input voltage of the stepper motor is 1.8 V. Since there is a slight gap among the cooperation of the mechanical structures, the actual quantity of change in the initial stage will include empty back data, and the actual quantity of change including the empty back data will not be counted into the error calculation range.

TABLE 4

| | Error Range | |
| --- | --- | --- |
| | Hyperopia-Myopia | Myopia-Hyperopia |
| Example 1 | −0.010-0.010 | −0.009-0.006 |
| Example 2 | −0.010-0.009 | −0.006-0.007 |
| Example 3 | −0.010-0.010 | −0.007-0.010 |

It can be seen from Table 4 that two endpoints of the error range of Examples 1 to 3 are the minimum and maximum values of the errors in Tables 1 to 3, respectively. The errors are obtained by comparing with a preset quantity of change as setting and calculating. It can be seen that the stepper motor is adopted to drive the displaying component to adjust the diopter, and the driving accuracy can be accurately within ±0.01 mm.

In another embodiment, the present invention provides a head-mounted display including the system for actively adjusting diopter of a head-mounted display as described in any one of the above.

The head-mounted display includes a control terminal, a display main body and a head-mounted portion, wherein the diopter adjustment device is disposed on the display main body, the display main body is electrically connected to the control terminal, and the head-mounted portion is connected to the display main body.

In the present application, a target diopter value is inputted and converted into a corresponding control signal. Instead of the manner of passively feeding back the diopter value by a traditional mechanical structure, the motor driving component actively adjusts the relative distance between the displaying component of the head-mounted display and the optical component according to the control signal, can reduce the accumulation of errors during the diopter adjustment process and achieve precise control, and has high driving accuracy, so that when in use, the head-mounted display can better adapt to the diopter of a wearer, bringing a better experience effect to the wearer.

It should be understood that improvements or changes can be made by those skilled in the art according to the description above, and all these improvements and changes should fall within the claimed scope of the appended claims of the present invention.

The invention claimed is:

1. A method for actively adjusting diopter of a head-mounted display, comprising the following steps:
adjusting a relative distance between a displaying component of the head-mounted display and an optical component by a motor driving component;
presetting a mapping relationship between a diopter value and a motor pulse number;
accordingly converting into a control signal for the motor driving component according to the mapping relationship; and
actively adjusting the relative distance between the displaying component of the head-mounted display and the optical component by the motor driving component according to the control signal;
wherein the accordingly converting into a control signal for the motor driving component according to the mapping relationship comprises:
calculating a gear difference between a target diopter value and a current diopter value;
calculating a desired motor pulse number according to the gear difference;

accordingly converting the motor pulse number into a control signal of the motor driving component according to the mapping relationship, and outputting the control signal; and wherein a driving accuracy range of the motor driving component is ±0.010 mm.

2. The method for actively adjusting diopter of ahead-mounted display according to claim 1, wherein: the step of presetting a mapping relationship between a diopter value and a motor pulse number specifically comprises:

calculating a quantity of change in the relative distance between the displaying component of the head-mounted display and the optical component generated each time one diopter gear is switched; and calculating and saving a desired motor pulse number according to the quantity of change.

3. The method for actively adjusting diopter of ahead-mounted display according to claim 1, further comprising the steps of:

actively adjusting the relative distance between the displaying component of the head-mounted display and the optical component by the motor driving component, to reset the current diopter value to diopter of 0°.

4. The method for actively adjusting diopter of ahead-mounted display according to claim 1, further comprising the steps of:

setting and saving the diopter value that changes each time one diopter gear is switched;

setting and saving an adjustment range of the diopter gear.

5. The method for actively adjusting diopter of ahead-mounted display according to claim 4, wherein the diopter value changed each time the one diopter gear is adjusted is set to D, and a value range of D satisfies the following relational expression (1):

$$25° \le D \le 100°. \tag{1}$$

6. The method for actively adjusting diopter of ahead-mounted display according to claim 4, wherein an adjustment range of the diopter gear is −800°−+200°.

7. The method for actively adjusting diopter of a head-mounted display according to claim 1, wherein the relative distance between the displaying component of the head-mounted display and the optical component is set to x according to the quantity of change generated by the control signal, and a value range of x satisfies the following relational expression (2):

$$-2.960 \le x \le 0.740. \tag{2}$$

8. A system for actively adjusting diopter of ahead-mounted display, comprising a processor and a memory storing program codes, wherein the processor performs the stored program codes for:

presetting a mapping relationship between a diopter value and a motor pulse number; and accordingly converting an input signal into a control signal for a motor driving component according to the mapping relationship;

controlling the motor driving component to actively adjust the relative distance between the displaying component of the head-mounted display and the optical component according to the control signal;

inputting a correction instruction and a diopter adjustment instruction; and outputting the control signal to the motor driving component, wherein the relative distance between the displaying component of the head-mounted display and the optical component is actively adjusted by the motor driving component according to the control signal;

the accordingly converting into a control signal for the motor driving component according to the mapping relationship comprises:

calculating a gear difference between a target diopter value and a current diopter value;

calculating a desired motor pulse number according to the gear difference;

accordingly converting the motor pulse number into a control signal of the motor driving component according to the mapping relationship, and outputting the control signal; and wherein a driving accuracy range of the motor driving component is ±0.010 mm.

9. The system for actively adjusting diopter of a head-mounted display according to claim 8, wherein the processor performs the stored program codes for:

outputting a correction instruction to the motor driving component.

10. A head-mounted display, comprising the system for actively adjusting diopter of a head-mounted display according to claim 8.

* * * * *